United States Patent [19]
Maraia

[11] Patent Number: 4,796,935
[45] Date of Patent: Jan. 10, 1989

[54] PROTECTIVE BODY BUMPER STRIP FOR A MOTOR VEHICLE

[76] Inventor: Charles Maraia, 24-13 33rd St., Astoria, N.Y. 11102

[21] Appl. No.: 75,414

[22] Filed: Jul. 20, 1987

[51] Int. Cl.⁴ .............................................. B60R 19/04
[52] U.S. Cl. ...................................... 293/128; 280/770
[58] Field of Search ......................... 293/128; 280/770

[56] References Cited

U.S. PATENT DOCUMENTS

| | | | |
|---|---|---|---|
| 3,596,962 | 8/1971 | Hertzell | 293/128 |
| 4,401,331 | 8/1983 | Ziner et al. | 293/128 |
| 4,707,008 | 11/1987 | Falco | 293/128 |
| 4,726,614 | 2/1988 | Myers et al. | 293/128 |

Primary Examiner—Robert R. Song
Attorney, Agent, or Firm—Michael I. Kroll

[57] ABSTRACT

A protective body bumper strip for a motor vehicle is provided and consists of an elongated elastic belt that removably attaches to door and side body of a motor vehicle from front wheel well to rear wheel well to give maximum protection against minor damage thereto. The bumper strip can be adjustable so as to any type of motor vehicle.

5 Claims, 1 Drawing Sheet

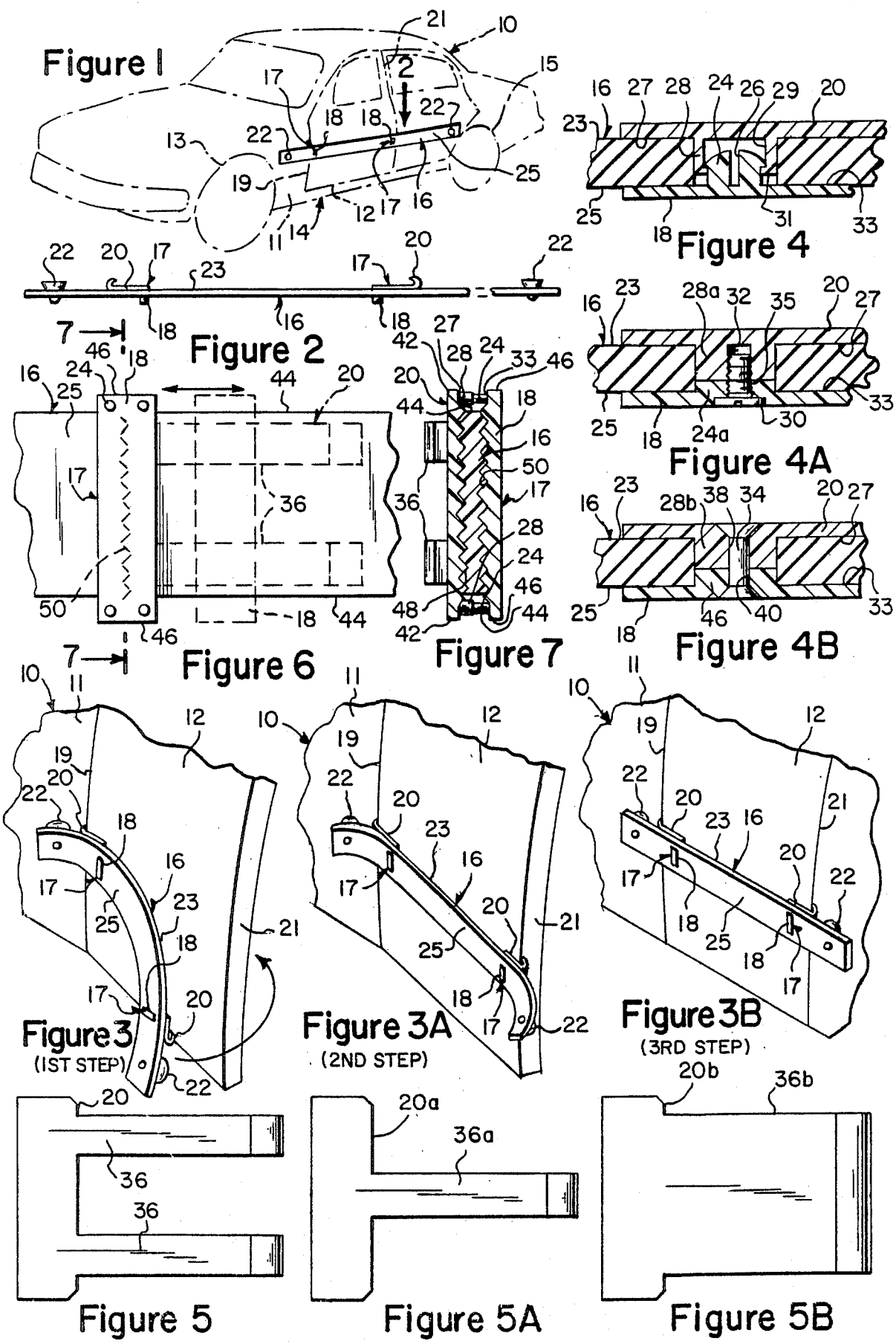

PROTECTIVE BODY BUMPER STRIP FOR A MOTOR VEHICLE

BACKGROUND OF THE INVENTION

1. Field of the Invention

The instant invention relates generally to door bumpers and more specifically it relates to a protective body bumper strip for a motor vehicle.

2. Description of the Prior Art

Numerous door bumpers have been provided in prior art that are adapted to protect a motor vehicle's body against nicks, dents and scratches. While these units may be suitable for the particular purpose to which they address, they would not be as suitable for the purposes of the present invention as heretofore described.

SUMMARY OF THE INVENTION

A primary object of the present invention is to provide a protective body bumper strip for a motor vehicle that will overcome the shortcomings of the prior art devices.

Another object is to provide a protective body bumper strip for a motor vehicle that removably attaches to door and side body of the motor vehicle from front wheel well to rear wheel well to give maximum protection against minor damage.

An additional object is to provide a protective body bumper strip for a motor vehicle that is adjustable so as to fit any type of motor vehicle.

A further object is to provide a protective body bumper strip for a motor vehicle that is simple and easy to use.

A still further object is to provide a protective body bumper strip for a motor vehicle that is economical in cost to manufacture.

An important object of the instant invention is to provide a protective body bumper strip that uses suction cups so that they adhere to any surface without scratching as compared to previously used magnets that do not adhere to fiberglass bodied automobiles.

Further objects of the instant invention will appear as the description proceeds.

To accomplish the above and related objects the instant invention may be embodied in the form illustrated in the accompanying drawings, attention being called to the fact that the drawings are illustrative only and that changes may be made in the specific construction illustrated and described within the scope of the appended claims.

BRIEF DESCRIPTION OF THE DRAWING FIGURES

FIG. 1 is a perspective view of the invention affixed to doors and side body of a motor vehicle shown in phantom.

FIG. 2 is a top view taken in direction of arrow 2 in FIG. 1.

FIGS. 3, 3A and 3B are perspective views of a portion of the motor vehicle showing various steps for installing the invention thereto.

FIG. 4 is an enlarged cross sectional view taken along line 4—4 in FIG. 1 showing a first way of fastening the face plate and clip member to the belt.

FIG. 4A is an enlarged cross sectional view similar to FIG. 4 showing a second way of fastening the face plate and clip member to the belt.

FIG. 4B is an enlarged cross sectional view similar to FIG. 4 showing a third way of fastening the face plate and clip member to the belt.

FIG. 5 is an elevational view taken in direction of arrow 5 in Figure Z showing the clip member having two hook arms.

FIG. 5A is an elevational view similar to FIG. 5 showing the clip member having one narrow hook arm.

FIG. 5B is an elevational view similar to FIG. 5 showing the clip member having one wide hook arm.

FIG. 6 is a front view of a portion of the belt showing the face plate and clip member being adjustable along the belt.

FIG. 7 is a cross sectional view taken along line 7—7 in FIG. 6 showing the gripping teeth in greater detail.

DETAILED DESCRIPTION OF THE PREFERRED EMBODIMENTS

Turning now descriptively to the drawings, in which similar reference characters denote similar elements throughout the several views, FIGS. 1 through 3B illustrates a protective body bumper 14 for a motor vehicle 10. The bumper strip 14 consists of an elongated elastic belt 16, that is fabricated out of any type of stretchable material and is typically positioned against side body 11 of the motor vehicle 10 between front wheel well 13 and rear wheel well 15. A pair of clamping members 17 are spaced apart and affixed to the belt 16 so that the clamping members 17 can removably engage with forward and rearward edges 19 and 21 of front door 12 of the motor vehicle (see FIGS. 3 and 3A). A pair of suction cups 22 are spaced apart and affixed to the belt 16 so that the suction cups can removably engage with the side body 11 of the motor vehicle 10 to position the belt 16 and give maximum protection against minor damage thereto.

Each of the clamping members 17 includes a clip member 20 that has two hook arms 36 to removably engage with one of the edges 19,21 of the front door 12 of the motor vehicle, as best shown in FIG. 5. The clip member 20 is positioned on inner surface 23 of the belt 16. A face plate 18 is positioned on outer surface 25 of the belt 16 in the vicinity of the clip member 20. The face plate 18 is fastened to the clip member 20 with the belt 16 being affixed therebetween.

FIG. 4 shows only one of a plurality of bosses 28 formed on inner surface 27 of the clip member 20. Each of the bosses 28 has an aperture 29 therein and a stop flange 31 in the aperture 29 on free end thereof. The bosses 28 extend through the belt 16. A plurality of snap-on rivets 24 are formed on inner surface 33 of the face plate 18. Each of the rivets 24 has a slot 26 thereion so that it can mate with the aperture 29 in one of the bosses 28 and be held thereto by the stop flange 31.

FIG. 4A is a first modification in which only one of a plurality of bosses 28a is shown formed on inner surface 27 of the clip member 20. Each of the bosses 28a has a threaded aperture 32 therein. The bosses 28a extend through the belt 16. A plurality of bosses 24a are formed on inner surface 33 of the face plate 18. Each of the bosses 24a has a threaded aperture 35 therethrough and the bosses 24a extend through the belt 16 to be in alignment with the bosses 28a. A plurality of threaded bolts 30 are provided in which each of the bolts 30 are threaded into the threaded aperture 35 in one of the bosses 24a and into the threaded aperture 32 in one of the bosses 28a.

FIG. 4B is a second modification in which only one of a plurality of bosses 28b is shown formed on inner surface 27 of the clip member 20. Each of the bosses 28b has a countersunk aperture 38 therethrough and the bosses 28b extend through the belt 16. A plurality of bosses 24b are formed on inner surface 33 of the face plate 18. Each of the bosses 24b has a countersunk aperture 40 therethrough and the bosses 24b extend through the belt 16 to be in alignment with the bosses 28b. A plurality of countersunk rivets 34 are provided. Each of the rivets 34 is secured into the countersunk aperture 38 in one of the bosses 28b and into the countersunk aperture 40 in one of the bosses 24b.

FIGS. 6 and 7 is a third modification in which the bosses 28 are formed on inner surface 27 of the clip member 20 at remote ends 42 thereof. Each of the bosses 28 are identical to the boss 28 in FIG. 4 but extend past both edges 44 of the belt 16. The snap-on rivets 24 are formed on inner surface 33 of the face plate 18 at remote ends 46 thereof. Each of the rivets 24 are identical to the rivet 24 in FIG. 4 and mate with the boss 28. A first set of gripping teeth 48 are formed on the inner surface 27 of the clip member 20 between the bosses 28. A second set of gripping teeth 50 are formed on inner surface 33 of the face plate 18 between the rivets 24 so that the first set of gripping teeth 48 and the second set of gripping teeth 50 can engage with the belt 16 thus making the clamping member 17 adjustable to the belt 16 so as to fit any type of motor vehicle 10.

The clip member 20 can have two spaced apart narrow arms 36, shown in FIG. 5, a narrow arm 36a, shown in FIG. 5A or a wide arm 36b shown in FIG. 5B and be fabricated out of plastic material or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A protective body bumper strip for a motor vehicle, said bumper strip comprising:
   (a) an elongated elastic belt to be positioned against side body of the motor vehicle between front wheel well and rear wheel well;
   (b) a pair of clamping member, spaced apart and affixed to said belt so that said clamping members can removably engage with forward and rearward edges of front door of the motor vehicle, said clamping members including a clip member having at least one hook arm to removably engage with one of the edges of the front door of the motor vehicle, said clip member positioned on inner surface of said belt, and a face plate positioned on outer surface of said belt in the vicinity of said clip member, and means for fastening said face plate to said clip member with said belt being affixed therebetween; and
   (c) a pair of suction cups, spaced apart and affixed to said belt so that said suction cups can removably engage with the side body of the motor vehicle to position the belt and give maximum protection against minor damage thereto.

2. A protective body bumper strip as recited in claim 1, wherein said fastening means includes:
   (a) a plurality of bosses formed on inner surface of said clip member, each of said bosses having an aperture therein and a stop flange in the aperture on free end thereof, said bosses extending through said belt; and
   (b) a plurality of snap-on rivets formed on inner surface of said face plate each of said rivets having a slot therein so that it can mate with the aperture in one of said bosses and be held thereto by the stop flange.

3. A protective body bumper strip as recited in claim 1, wherein said fastening means includes:
   (a) a plurality of first bosses formed on inner surface of said clip member, each of said first bosses having a threaded aperture therein, said first bosses extending through said belt;
   (b) a plurality of second bosses formed on inner surface of said face plate, each of said second bosses having a threaded aperture therethrough said second bosses extending through said belt to be in alignment with said first bosses; and
   (c) a plurality of threaded bolts, each of said bolts threaded into the threaded aperture in one of said second bosses and into the threaded aperture in one of said first bosses.

4. A protective body bumper strip as recited in claim 1, wherein said fastening means includes:
   (a) a plurality of first bosses formed on inner surface of said clip member, each of said first bosses having a countersunk aperture therethrough, said first bosses extending through said belt;
   (b) a plurality of second bosses formed on inner surface of said face plate, each of said second bosses having a countersunk aperture therethrough, said second bosses extending through said belt to be in alignment with said first bosses; and
   (c) a plurality of countersunk rivets, each of said rivets secured into the countersunk aperture in one of said first bosses and into the countersunk aperture in one of said second bosses.

5. A protective body bumper strip as recited in claim 1, wherein said fastening means includes:
   (a) a plurality of bosses formed on inner surface of said clip members at remote ends thereof, each of said bosses having an aperture therein and a stop flange in the aperture on free end thereof, said bosses extending past both edges of said belt;
   (b) a plurality of snap on rivets formed on inner surface of said face plate at remote ends thereof, each of said rivets having a slot therein, so that it can mate with the aperture in one of said bosses and be held thereto by the stop flange;
   (c) a first set of gripping teeth formed on the inner surface of said clip member between said bosses; and
   (d) a second set of gripping teeth formed on inner surface of said face plate between said rivets so that said first set of gripping teeth and said second set of gripping teeth can engage with said belt thus making said clamping member adjustable to said belt so as to fit any type of motor vehicle.

* * * * *